(12) United States Patent
Okamoto

(10) Patent No.: US 6,273,405 B2
(45) Date of Patent: Aug. 14, 2001

(54) STAY DAMPER

(75) Inventor: Toshikazu Okamoto, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/725,877

(22) Filed: Nov. 30, 2000

(30) Foreign Application Priority Data

Dec. 1, 1999 (JP) .................................................. 11-342580

(51) Int. Cl.[7] ...................................................... F16F 9/32
(52) U.S. Cl. ........................ 267/64.12; 188/300; 267/120
(58) Field of Search ............................... 267/64.12, 120; 188/300; 248/161

(56) References Cited

U.S. PATENT DOCUMENTS 4,596,383 * 6/1986 Howard .............................. 267/64.12
5,358,225 * 10/1994 Volpel et al. ..................... 267/64.12

FOREIGN PATENT DOCUMENTS 1-128038     8/1989  (JP) .

* cited by examiner

*Primary Examiner*—Christopher P. Schwartz
(74) *Attorney, Agent, or Firm*—Foley & Lardner

(57) ABSTRACT

A stay damper for a door etc., includes a cylinder member filled with filler gas under pressure, a piston rod slidable in the cylinder member and a cover supported by the projecting end of the piston rod so that the lower end of the cover can move radially toward and away from the cylinder. The upper end of the cylinder member is formed with a notch opening upward. When the stay damper is extended, the notch of the cylinder member catches the lower end of the cover and prevents inward movement of the piston rod to hold the stay damper in the extended state.

12 Claims, 4 Drawing Sheets

FIG.1 FIG.2
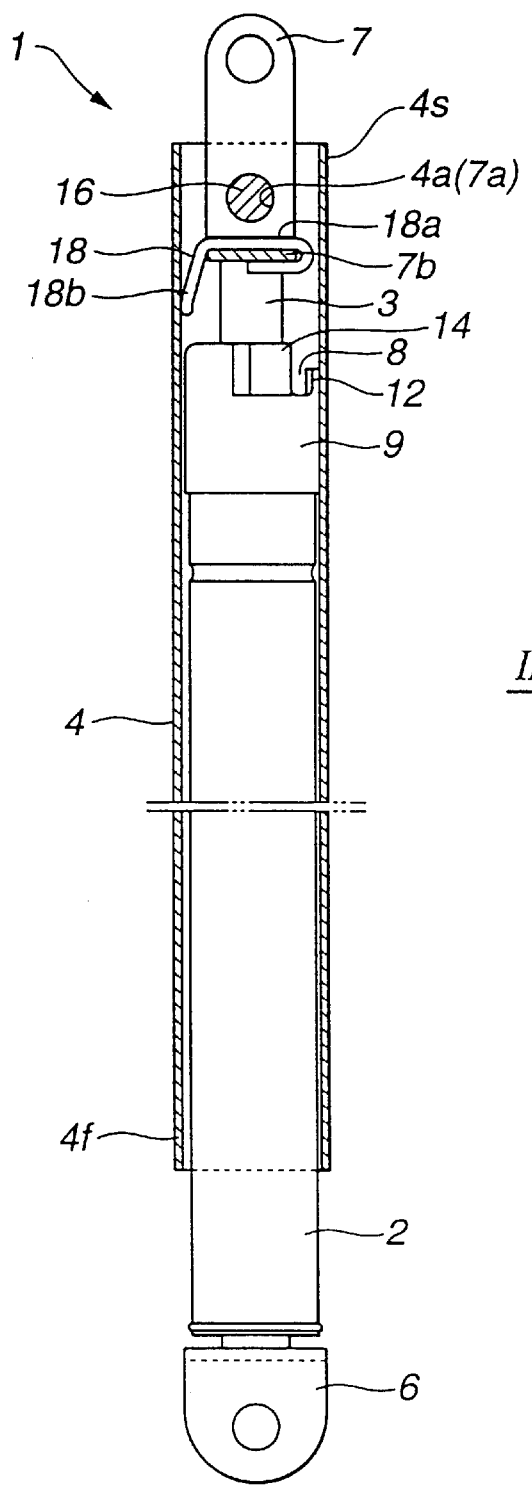
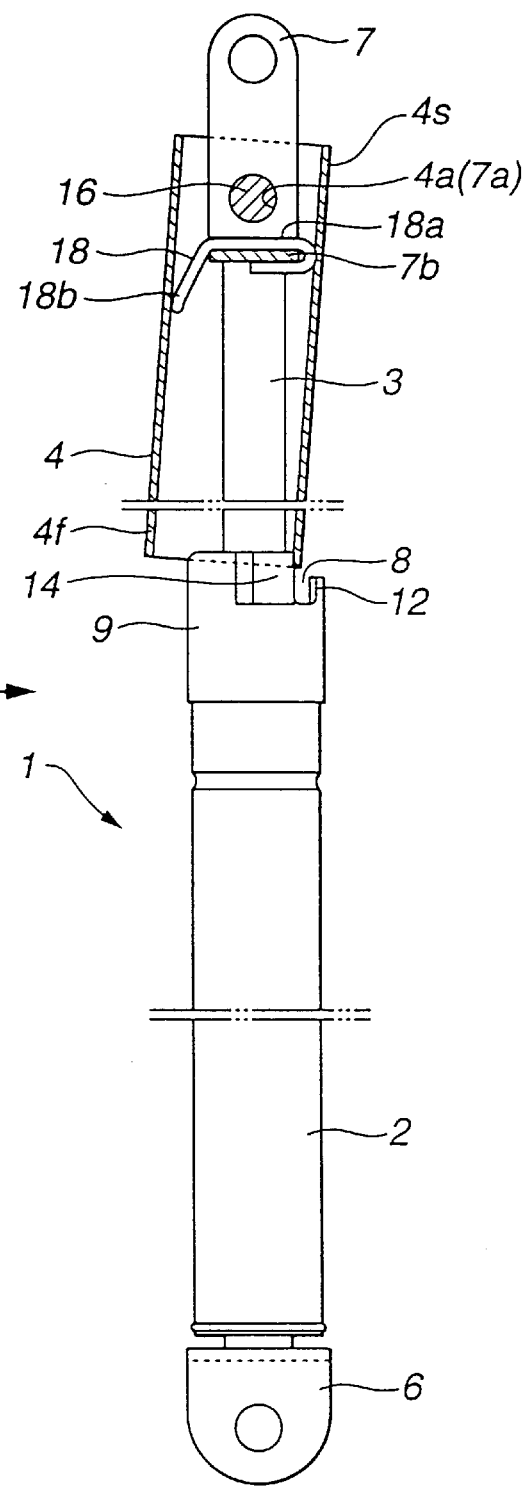

STAY DAMPER

BACKGROUND OF THE INVENTION

The present invention relates to stay dampers used for back doors for motor vehicles, and doors or other movable members for various instruments and apparatus.

A Japanese laid-open Utility Model Application, Kokai No. H01(1989)-128038 discloses a stay damper including a cylinder, a piston rod and a cover of elastic material.

SUMMARY OF THE INVENTION

It is an object of the present invention to provide a stay damper capable of holding a piston rod reliably at an extended state.

According to the present invention, a stay damper comprises a cylinder member, a piston rod and a cover. The cylinder member is filled with pressurized filler gas, and extends from a first cylinder end to a second cylinder end which is formed with a notch opening in an axial direction. The piston rod is received slidably in the cylinder member. The piston rod projects from the second cylinder end of the cylinder member, and extends to a projecting rod end. The cover extends from a first cover end to a second cover end which is supported by the projecting rod end of the piston rod in a manner to allow the first cover end to move radially toward the cylinder member, and to enter the notch of the cylinder member.

A stay damper according to another aspect of the invention comprises: a cylinder member extending, in a first longitudinal direction of the stay damper, from a first cylinder end to a second cylinder end which is formed with a notch opening in the first longitudinal direction; a piston rod slidably received in the cylinder member, for moving in the first longitudinal direction relative to the cylinder member for extension of the stay damper, and in a second longitudinal direction opposite to the first longitudinal direction relative to the cylinder member for contraction of the stay damper, the piston rod projecting, in the first longitudinal direction, to a projecting rod end, from the second cylinder end of the cylinder member; and a cover extending, in the first longitudinal direction, from a first cover end to a second cover end which is supported by the rod end of the piston rod in a movable manner to allow the first cover end to move to an off-center position to prevent contraction of the stay damper by engagement of the first cover end of the cover with the notch of the cylinder member.

The other objects and features of this invention will become understood from the following description with reference to the accompanying drawings.

BRIEF DESCRIPTION OF THE DRAWINGS

FIG. 1 is a view showing, in section, a stay damper according to a first embodiment of the present invention in a most compressed state.

FIG. 2 is a view showing the stay damper of FIG. 1 in a most extended state.

DETAILED DESCRIPTION OF THE INVENTION

Figure 3:
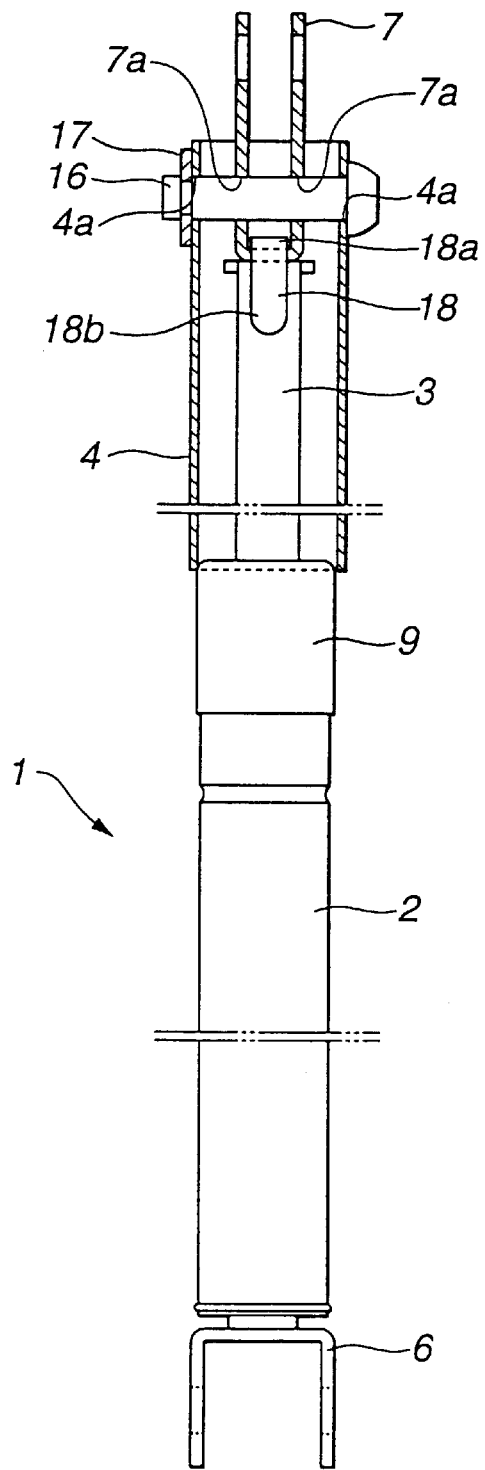
FIG. 3 is a view of the stay damper of FIG. 1, as viewed from a direction shown by an arrow III in FIG. 2.

FIGS. 1–3 shows a stay damper (or gas stay) 1 according to a first embodiment of the present invention.

The stay damper 1 includes a cylinder member including a tubular cylinder (or tube) 2, a piston rod 3 and a cover 4. The cylinder member extends longitudinally (upward as viewed in FIG. 1) from a first (lower) cylinder end to a second (upper) cylinder end. The piston rod 3 is slidably received in the cylinder 2. The piston rod 3 projects (upward as viewed in FIG. 1) from the second cylinder end, to a projecting rod end. The cover 4 is tubular and the cylinder 2 is received in the cover 4 in the state of FIG. 1. The cover 4 extends longitudinally (upward in FIG. 1) from a first cover end 4f to a second cover end 4s. The cover 4 is supported, at the second (upper) cover end 4s, by the projecting rod end of the piston rod 3. The term "end" is used herein to refer to a portion at and near an extremity of a long member.

The cylinder 2 has a gas chamber therein which is filled with gas under pressure together with a small amount of lubricating oil. The cylinder 2 includes a guide member (not shown) provided at the second cylinder end. The piston rod 3 passes through the guide member. The piston rod 3 is movable, relative to the cylinder 2 through the guide member, outward (upward in FIG. 1) for extension to make the stay damper 1 longer, and inward (downward) for contraction to make the stay damper 1 shorter. An approximately U-shaped first fitting member 6 is attached to the first (lower) cylinder end of the cylinder 2 which is a closed end. An approximately U-shaped second fitting member 7 is attached to the projecting rod end of the piston rod 3. Through the fitting members 6 and 7, the stay damper 1 is connected between a door and a frame (such as casing or vehicle body).

The second (upper) cylinder end of the cylinder member (2, 9) is formed with a notch 8 extending longitudinally. The notch 8 is open in a first longitudinal direction (upward direction as viewed in FIG. 1), and designed to receive a part of the first (lower) end 4f of the cover 4 in the state shown in FIG. 2. In this example, the cylinder member further includes an end member or rod cover 9 in addition to the cylinder 2. The end member 9 is provided at the second (upper) cylinder end, and attached to the upper end of the cylinder 2. In this example, the notch 8 is formed in the end member 9.

Figure 4A:
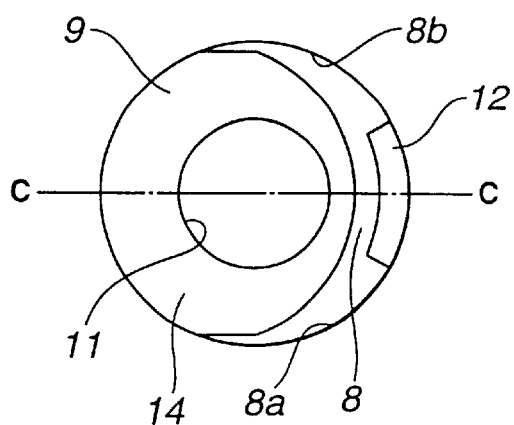
FIG. 4A is a plan view showing an end member or rod cover in the stay damper of FIG. 1.
Figure 4B:
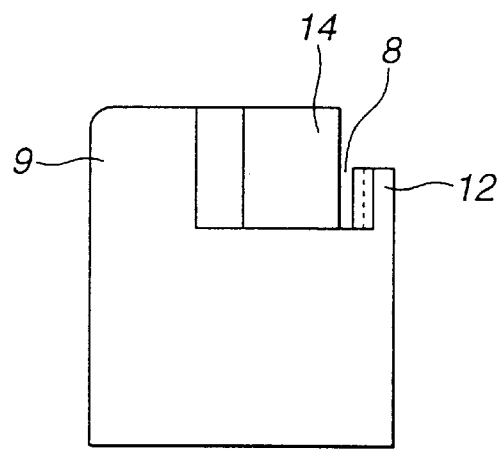
FIG. 4B is a front view of the end member of FIG. 4A.
Figure 4C:
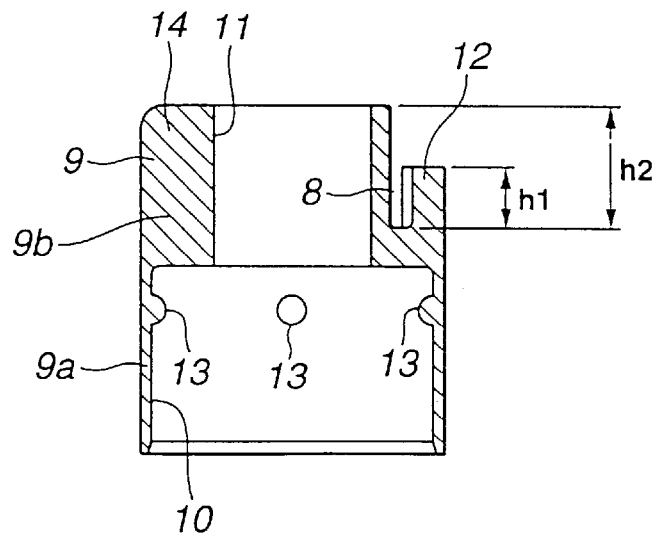
FIG. 4C is a sectional view taken across a line C—C in FIG. 4A.

The end member (rod cover) 9 of this example is made of synthetic resin, and in the form of a hollow cylindrical member open at both ends. As shown in FIGS. 4A, 4B and 4C, the end member 9 is formed with a stepped cylindrical cavity including a larger cylindrical hole 10 and a smaller cylindrical hole (or rod hole) 11 extending continuously and coaxially from the larger cylindrical hole 10. The larger cylindrical hole 10 is sized to fittingly receive the upper end of the cylinder 2. The smaller cylindrical hole 11 is smaller in inside diameter than the larger cylindrical hole 10, and the smaller cylindrical hole 11 is sized to slidably receive the piston rod 3.

The end member (rod cover) 9 includes a first section 9a formed with the larger hole 10, and a second section 9b including an inner portion 14 formed with the smaller hole 11 and a projection 12. In this example, the projection 12 is an outer wall. The notch 8 is formed, in the second section 9b, between the inner portion 14 and the outer wall 12. As viewed in FIG. 4A, the notch 8 extends circumferentially like an arc having a radius approximately equal to the radius of the cylindrical cover 4, from a first end (or slot) 8a opening in a first radial direction to a second end (or slot) 8b opening in a second radial direction. Thus, the notch 8 is open in the axial direction (or upward direction as viewed in FIG. 4C), and in the first and second radial directions of the cylindrical hole 11.

The outer wall 12 is separated from the inner portion 14 by the notch 8. The outer wall 12 formed on the radial outer side of the notch 8 projects axially (upward), and the height h1 of the outer wall 12 (from the level of the bottom of the notch 8) is smaller than the height h2 of the inner portion 14, as shown in FIG. 4C. The circumferential length of the outer wall 12 is relatively short as shown in FIG. 4A. The wall thickness of the outer wall 12 is not smaller than a predetermined width, and substantially uniform. The outer wall 12 is bounded circumferentially between the first and second open ends 8a and 8b of the notch 8.

In the larger hole 10, there are formed a plurality of projections 13 projecting radially toward the axis of the cylindrical hole 10. The projections 13 (four in number, for example) are arranged in a circle at regular intervals. When the end member 9 is attached to the upper end of the cylinder 2, the projections 13 are engaged with a circumferential groove formed in the outside circumference of the upper end of the cylinder 2 to prevent the end member 9 from being extracted.

The end member 9 is attached to the upper end of the cylinder 2 together with the piston rod 3 held inserted through the smaller hole (or rod hole) 11, by fitting the first section 9a of the end member 9 over the upper end of the cylinder 2.

The cover 4 is made of metallic material or synthetic resin. In this example, the cover 4 is a rigid member. The cover 4 is in the form of a hollow cylinder which is open at both ends. The inside diameter of the cover 4 is greater than the outside diameter of the cylinder 2. The cover 4 is attached to the projecting rod end of the piston rod 3. In this example, the cover 4 is swingably mounted on the projecting end of the piston rod 3 through the fitting member 7. A swing shaft 16 extends diametrically through holes 4a formed in the second (upper) end 4s of the cover 4, and holes 7a formed in the U-shaped fitting member 7, as shown in FIG. 3. The first (lower) end 4f of the cover 4 is swingable about the diametrically extending swing shaft 16, as shown in FIG. 2. The swing shaft 16 is held in position by a retaining ring 17 shown in FIG. 3 designed to prevent the swing shaft 16 from being extracted.

A spring member 18 urges the first end 4f of the cover 4 to move approximately in a radial direction. The spring member 18 of this example is arranged to urge the cover 4 to swing on the swing shaft 16 in a clockwise direction as viewed in FIG. 2. The spring member 18 is a shaped plate of spring material, and includes a base portion 18a which is bent so as to clamp a base portion 7b of the U-shaped fitting member 7, and an oblique extension 18b bent downward in FIG. 2 at an end of the base portion 7a as shown in FIG. 2. The end of the oblique extension 18b abuts on the inside surface of the cover 4 at the position lower than the swing shaft 16, and thereby urges the cover 4 in the clockwise direction in FIGS. 1 and 2.

When the stay damper 1 is used as a stay for a door, the fitting member 6 is connected to a main body (or frame or vehicle body), and the fitting member 7 is connected to a door.

When the door is in a closed position, the stay 1 is in the most compressed state shown in FIG. 1 in which the piston rod 3 is inserted most deeply into the cylinder 2. In this state, the cylinder 2 is received deeply in the cover 4, and the inside surface of the first (lower) end 4f of the cover 4 touches the outside cylindrical surface of the cylinder on the right side as viewed in FIG. 1 by the force of the spring member 18 urging the cover 4 in the clockwise rotational direction.

During an operation of opening the door, the piston rod 3 moves gradually out of the cylinder 2 with an assist of a reaction force applied on the piston rod 3 by the filler gas in the cylinder in accordance with a volume of the piston rod 3 inserted into the cylinder 2.

When the door is opened, the piston rod 3 reaches the most extended state in which the piston rod 3 projects most outwardly from the cylinder 2. In this state, the door is held in the open state by the stay damper 1 with the gas reaction force which continues acting on the piston rod 3 to urge the piston rod 3 in the door opening direction.

During the outward movement of the piston rod 3 in the projecting direction from the cylinder 2, the cover 4 moves together with the piston rod 3 with the first (lower) end 4f of the cover 4 being held in contact with the outside cylindrical surface of the cylinder 2. In the open state of the door, the first (lower) end 4f of the cover 4 is held in an off-center position shown in FIG. 2 by the spring member 18, and the part (right-hand part in FIG. 2) of the first (lower) end 4f of the cover 4 is just above the notch 8 of the cylinder member (2, 9), or slightly away axially from the open end of the notch 8.

The first (lower) end 4f of the cover 4 is always urged by the spring member 18 in the clockwise direction (approximately in a radial direction). In the off-center position shown in FIG. 2, the first (lower) end 4f of the cover 4 can enter the notch 8 when the piston rod 3 moves slightly in the inward direction into the cylinder 2. When the force of the spring member 18 is weak, it is possible to move the first end 4f of the cover 4 to the off-center position by hand. Moreover, it is possible to rotate the end member 9 by hand to bring the notch 8 to a position adequate to receive the first end 4f of the cover 4 in the off-center position.

The outer wall 12 is lower than the inner portion 14. Therefore, the first end 4f of the cover 4 can swing radially to a position abutting the wall of the inner portion 14 as shown in FIG. 2 by the action of the spring member 18 when the first end 4f of the cover 4 climbs over the outer wall 12.

If, in the stay damper 1 holding the door open, the gas pressure lowers below a level to produce a required gas reaction force because of a decrease of the ambient temperature or leakage of the gas, or if an unexpected force is applied on the door in the closing direction, then the cover 4 held in the swung state shown in FIG. 2 by the spring member 18 is moved inward with the inward movement of the piston rod 3. Therefore, a part of the first (lower) end 4f of the cover 4 moves into the notch 8, and limits further inward movement of the piston rod 3 by abutting on the bottom of the notch 8. Thus, the stay damper 1 can hold the door open. The notch 8 holds the cover 4 in the engaged state reliably and prevents the cover 4 from being disengaged even if an external force is applied on the cover 4.

It is possible to disengage the cover 4 from the notch 8 of the cylinder member by moving the piston rod 3 slightly in the outward direction or extending direction, and swinging the cover 4 about the swing shaft 16 in a disengaging direction (counterclockwise direction as viewed in FIG. 2).

The thus-constructed stay damper 1 can maintain a predetermined length of the stay reliably. The use of the end member or rod cover 9 facilitates the production of stay dampers for various doors different in the angle of the door open state, by preparing different end members having different axial lengths, and replacing one with another. The wall of the inner portion 14 overtopping the outer wall 12 can catch the first (lower) cover end 4f of the cover 4 and hold the first cover end 4f correctly in the off-center position ready for engagement with the notch 8. The spring member 18 can bring the cover 4 to the swung position shown in FIG. 2 without the need for operating the cover 4 manually.

Figure 5:
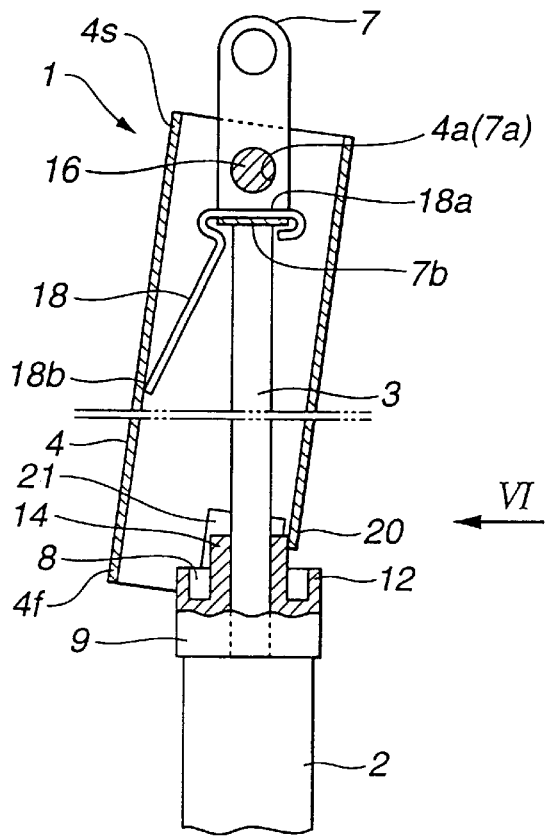
FIG. 5 is a view similar to FIG. 2, but showing a stay damper according to a second embodiment of the present invention.
Figure 6:
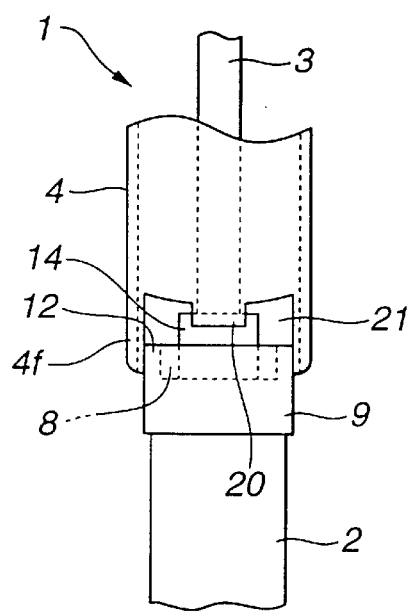
FIG. 6 is a view of the stay damper of FIG. 5 as viewed from a direction shown by an arrow VI in FIG. 5.

FIGS. 5 and 6 show a stay damper (or gas stay) according to a second embodiment of the present invention. In the second embodiment, the notch 8 is annular, and a projection 20 is formed in the first (lower) end 4f of the cover 4.

The annular notch 8 is defined between the cylindrical inner portion 14 formed with the hole for receiving the piston rod 3, and the outer wall 12 extending all around the annular notch 8. In this example, the cylindrical inner portion 14, the annular notch 8 and the annular outer wall 12 are formed coaxially with one another, in the end member or rod cover 9. The annular notch 8 is open only in the axial direction toward the projecting rod end of the piston rod 3. The central inner portion 14 extends axially beyond the outer wall 12, as in the first embodiment.

The first (lower) end 4f of the cover 4 is formed with a cutout 21, and the projection 20 for engaging with the annular notch 8 of the cylinder member (2, 9). The cutout 21 extends circumferentially about 180° so as to describe a semicircular arc, and extends axially from the edge of the cover 4 to a bottom of the cutout 21 toward the second cover end 4s. The cutout 21 is defined by the bottom extending approximately like a semicircular arc and left and right straight sides extending axially. The projection 20 projects from the middle of the bottom in the cutout 21, as shown in FIG. 6. The axial height of the projection 20 is smaller than the axial depth of the cutout 21.

In the other respects, the stay damper shown in FIGS. 5 and 6 is substantially identical to the stay damper shown in FIGS. 1~3.

The annular notch 8 can receive the projection 20 of the cover 4 at any rotational position. The cylinder member having the annular notch 8 of rotation symmetry facilitates the assembly process.

This application is based on a prior Japanese Patent Application No 11(1999)-342580. The entire contents of this Japanese Patent Application No. 11(1999)-342580 filed on Dec. 1, 1999 in Japan are hereby incorporated by reference.

Although the invention has been described above by reference to certain embodiments of the invention, the invention is not limited to the embodiments described above. Modifications and variations of the embodiments described above will occur to those skilled in the art in light of the above teachings.

For example, it is optional to omit the end member or rod cover 9 and to form the notch 8 directly in the cylinder 2. The cover 4 may be mounted on the piston rod 3 so that the cover 4 can move in the manner of translational motion in the radial direction by forming either or both of the through holes 4a and the through holes 7a in the shape of an elongate hole.

The scope of the invention is defined with reference to the following claims.

What is claimed is:

1. A stay damper comprising:
    a cylinder member filled with pressurized gas and extending from a first cylinder end to a second cylinder end formed with a notch opening in an axial direction;
    a piston rod received slidably in the cylinder member, the piston rod extending outward and comprising a projecting rod end projecting from the second cylinder end of the cylinder member; and
    a cover extending from a first cover end to a second cover end which is supported by the projecting rod end of the piston rod in a manner to allow the first cover end of the cover to move toward the cylinder member, and to enter the notch of the cylinder member.

2. The stay damper as claimed in claim 1, wherein the cylinder member comprises a tube extending from the first cylinder end to a tube end, and an end member mounted on the tube end of the tube and formed with the notch.

3. The stay damper as claimed in claim 1, wherein the second cylinder end of the cylinder member comprises an inner portion formed on a radial inner side of the notch, and a projection projecting axially on a radial outer side of the notch, and a height of the projection is smaller than a height of the inner portion.

4. The stay damper as claimed in claim 1, wherein the stay damper further comprises a spring member for urging the first cover end of the cover toward the cylinder member.

5. The stay damper as claimed in claim 1, wherein the notch is in the form of an arched groove open at both ends to receive a part of a cylindrical wall of the cover.

6. The stay damper as claimed in claim 1, wherein the notch is annular, and the first end of the cover is formed with a projection for entering the notch.

7. A stay damper comprising:
    a cylinder member defining a gas chamber therein and extending, in a first longitudinal direction of the stay damper, from a first cylinder end to a second cylinder end which is formed with a notch opening in the first longitudinal direction;
    a piston rod slidably received in the cylinder member, for moving in the first longitudinal direction relative to the cylinder member for extension of the stay damper, and in a second longitudinal direction opposite to the first longitudinal direction relative to the cylinder member for contraction of the stay damper, the piston rod projecting, in the first longitudinal direction, to a projecting rod end, from the second cylinder end of the cylinder member; and
    a cover extending, in the first longitudinal direction, from a first cover end to a second cover end which is supported by the projecting rod end of the piston rod in a movable manner to allow the first cover end to move to an off-center position to prevent contraction of the stay damper by engagement of the first cover end of the cover with the notch of the cylinder member.

8. The stay damper as claimed in claim 7, wherein the cover is mounted on the projecting rod end of the piston rod in such a swingable manner that the cover is swingable about a pivot axis extending across the projecting rod end of the piston rod, in a direction perpendicular to a longitudinal direction of the piston rod.

9. The stay damper as claimed in claim 7, wherein the notch extends, in the second longitudinal direction, to a bottom of the notch, the second cylinder end of the cylinder member comprises an inner portion formed with a rod hole receiving the piston rod, and an outer wall extending to a wall top in the first longitudinal direction from a level of the bottom of the notch, and defining the notch between the inner portion and the outer wall, and the inner portion extending in the first longitudinal direction beyond the wall top of the outer wall.

10. The stay damper as claimed in claim 9, wherein the notch extends circumferentially around a longitudinal center line of the cylinder member, from a first slot to a second slot, and the outer wall is bounded circumferentially between the first slot and the second slot.

11. The stay damper as claimed in claim 9, wherein the notch is annular, and surrounds the inner portion; the outer wall is annular and surrounds the notch; and the first cover end of the cover is formed with a projection projecting in the second longitudinal direction to engage with the notch.

12. The stay damper as claimed in claim 11, wherein the first cover end of the cover is formed with a cutout extending in the first longitudinal direction to a bottom of the cutout, and the projection projects within the cutout from the bottom of the cutout in the second longitudinal direction.

* * * * *